Oct. 8, 1940.  W. J. MILLER  2,217,346
METHOD OF MANUFACTURING LUGGED POTTERY WARE
Original Filed March 29, 1935

INVENTOR
William J. Miller
BY
george J. Croninger
ATTORNEYS

Patented Oct. 8, 1940

2,217,346

UNITED STATES PATENT OFFICE 2,217,346

METHOD OF MANUFACTURING LUGGED POTTERY WARE

William J. Miller, Swissvale, Pa.

Original application March 29, 1935, Serial No. 13,683. Divided and this application November 16, 1939, Serial No. 304,789

2 Claims. (Cl. 25—156)

This is a divisional application of a pending application to William J. Miller, Serial No. 13,683. It relates to a method of manufacturing lugged pottery ware and has to do with slip casting handles, protuberances and the like on preformed ceramic bodies such as cups.

Figure 1:
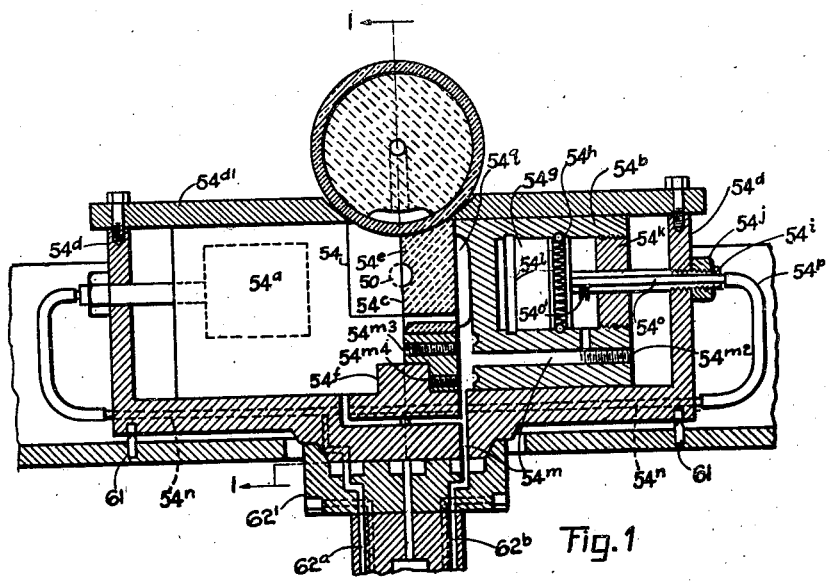
Figure 2:
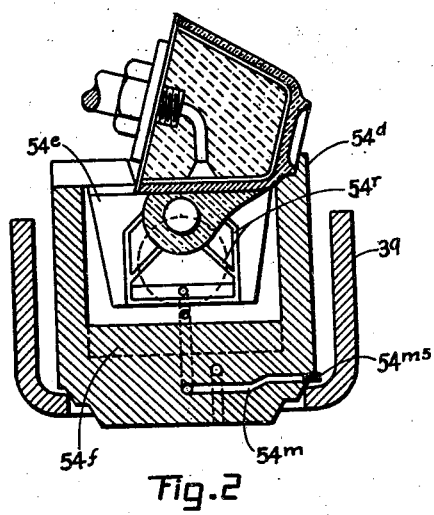

In the drawing, Fig. 1 is a sectional elevation of the preferred form of apparatus for carrying out the method and Fig. 2 is a section taken on the line 2—2 thereof.

The molds used for automatically applying handles and like appendages to the ware are generally indicated by the numeral 54 in the drawing and shown in detail in Figs. 1 and 2. The molds are disposed in open-bottomed trays or carriers 39. The body of the mold is formed in two sections or parts, 54a, 54b which are of similar construction, these parts being normally closed at the joint 54c, only one of said parts being shown in section in Fig. 1. The sections 54a and 54b have limited sliding movement in a frame 54d, said frame having a detachable cover 54d′ formed with a ware-positioning seat which is preferably faced with felt or some similar substance, to compensate for shrinkage and prevent marring of the ware deposited therein. The sections 54a and 54b may be of any suitable material, preferably non-corrosive, and in the abutting portions thereof are cut away to receive and retain the two halves of a supplemental mold 54e which is of porous material and constitutes the mold per se in which the handle or appendage is formed, the two halves of this mold 54e also joining at 54c when the sections are in closed position. The recesses for the porous halves or sections of the mold per se are V-shaped, so that by removing the cover 54d′, said mold may be removed and replaced by a mold for any desired appendage. The frame 54d in line with the joint 54c is formed with a guide block 54f, which assists in guiding and positioning the sections 54a and 54b when closing, and the bottom of said frame is shaped to center on the spotting chucks 62′, one of which is shown in section in Fig. 1. Each of the sections 54a and 54b is bored or recessed to form a cylinder 54g, in which a relatively stationary piston 54h is mounted, said piston being provided with an exteriorly-threaded stem 54i which is formed with a bore 54o and threaded into the side of the frame 54d and secured by a nut 54j, the cylinder walls being interiorly threaded for removable application of a sealing head 54k. The cylinder walls are formed with two annular spotting or positioning grooves 54l and the piston 54h is diametrically bored to receive a ball and spring detent assembly, the balls registering with the grooves when the sections 54a and 54b reciprocate, to thereby resiliently retain said sections in their alternate positions.

The mold sections 54a and 54b together with the respective halves of the appendage or handle mold 54e are adapted to be alternately retracted from abutting relation or parted and moved together by means of sub and super-atmospheric pressure. Preliminary to the retracting operation, it is preferred to impregnate the porous mold 54e with super-atmosphere, to thus ensure prompt release of the ware from the mold when the retracting pressure is applied. The operating pressure is applied through the passage 54n and the impregnating atmospheric pressure, which is not limited to super-atmosphere but may be any desired treating medium, or fluid is applied through the passage 54m. The bore or passage 54o in the piston stem is connected with the passage 54n by a hose or analogous member 54p, and the passage 54n in turn branches off at right angles and registers with a passage 62a formed in the spotting chuck 62′, the passage 62a connecting with an air line leading to a control valve. The passage 54m registers with a passage 62b, this passage 54m branching off and terminating in chambers 54q formed in the sections 54a and 54b on each side of the mold 54e and also branches off into the piston chamber, this latter branch passage being used when it is desired to use the passage 54m for applying both the impregnating pressure and operating pressure and is adjustably closed in the present instance by a threaded plug 54m2. The chambers 54q, only one of which is visible, communicate with branch passages formed in the sections of the mold 54e and terminating at the joint of the latter. The branch of the passage 54m leading to the chamber 54q may be adjusted through the medium of a screw plug 54m3, and communication to the chuck passage 62b may be closed by a screw plug 54m4, these plugs being inserted in each section 54a and 54b. The passage 54m also branches off and opens out in the side of the mold, see Fig. 2, which branch is shown closed by a screw plug 54m5. When it is desired to apply the impregnating pressure or other treating medium through one of the tray trunnions instead of through the chuck passage 62b, the branch passage leading to 62b is closed and the plug 54m5 replaced by a hose nipple. The bore 54o in the piston stem 54i terminates in the cylinder 54g on either side of the piston 54h, depending upon the position of a screw plug 54o', this plug being shown in the side of said stem, the sections being retracted in the present instance by sub-atmospheric pressure and closed by super-atmospheric pressure, whereas if the plug 54o' were inserted in the end of said section, this action would be reversed. To ensure communication with the mold cavity of the porous mold 54e, the abutting surfaces of the respective halves of the latter are grooved as at 54r, to provide vents leading to the mold cavity.

In operation, assuming the air pressure is to be applied through the chuck, air under pressure is first applied through passage 54m to impregnate the mold 54e and then through passage 54n and bores 54o into the cylinders 54g, which causes the sections 54a and 54b together with the halves of the porous mold 54e to slide back or retract sufficiently to remove the ware, after which suction pressure is set up in the said cylinders and the sections move into abutting relation.

When charging the mold, it is preferred to first apply sub-atmospheric pressure through passage 54m to extract air pockets and excess moisture from cavity of the mold 54e and the freshly formed handle or appendage therein, and subsequently apply super-atmospheric pressure through said passage to impregnate the porous mold 54e and ensure release of the appendage when the retracting pressure is applied through passage 54n and the mold is parted.

Generally stated, but subject to variation within the scope of the invention, the method of applying handles and utility appendages to such of the ware as desired consists in charging the mold 54 with clay in a fluid or semi-fluid state and then using a transfer-chuck assembly to place the ware in or on the mold against the handle or other appendage, the ware remaining in or on the mold until the clay sets, the mold being subsequently parted if required and the ware with the handle or figure attached thereto removed from the molds and the ware thereafter dried and fired.

The appendage mold cavity 56 is preferably filled slightly above its level or in excess of its capacity, so that when the cup or article of ware is deposited thereon, a slight bead or fillet is formed which eliminates crevices or cracks at the line of jointure. If the material is in such a fluid state as will readily flow, the mold cavity notwithstanding may be filled in excess of its capacity, as the capillary attraction inherent in the material permits the forming of a convex meniscus above the normal level of the mold. If shrinkage reduces the prominence of this convex formation or meniscus to any appreciable extent prior to application of the ware, it may be readily built up by a further relatively slight charge of slip. Shrinkage may also be regulated by reducing the water content of the slip and/or by deflocculation, as by incorporating a predetermined quantity of salts or electrolytes in the slip. To further improve the bond and perfect the blend at the line of jointure, when the cup or other article contacts with the convex charge of slip in the appendage mold, it may be given a rocking, angular horizontal or vertical shift, or combination or series of these movements. Also, a vacuum or sub-atmospheric condition may be set up in the cup or article of ware to ensure removal of entrapped air and surface water, and this suction action will also cause the slip to enter the pores of the wall of the article and improve the bond between the ware and its handle or appendage.

Having thus described my invention, what I claim is:

1. In a method of manufacturing lugged pottery receptacles, the steps consisting of preforming the body of the pottery receptacle, applying a lug mold against the preformed receptacle in such fashion as to bring the cavity opening into registry with the place on the receptacle determined upon for the lug, slip casting a lug, handle, or the like in said mold to unite with the preformed receptacle, and firing the lugged receptacle.

2. In a method of manufacturing lugged pottery receptacles, the steps consisting of preforming the body of the pottery receptacle, providing in registry with the place on the receptacle determined upon for the lug a mold cavity of the desired conformation, slip casting therein a lug, handle or the like, and firing the lugged receptacle.

WILLIAM J. MILLER.